L. S. HYPES.
ADJUSTABLE CLEVIS ATTACHMENT FOR PLOWS.
APPLICATION FILED AUG. 16, 1918.

1,311,230.

Patented July 29, 1919.

Witnesses
James F. Crown,

Inventor
Layman S. Hypes,
Richard B. Owen,
Attorney

UNITED STATES PATENT OFFICE.

LAYMAN S. HYPES, OF BLUEFIELD, WEST VIRGINIA.

ADJUSTABLE CLEVIS ATTACHMENT FOR PLOWS.

1,311,230.   Specification of Letters Patent.   Patented July 29, 1919.

Application filed August 16, 1918. Serial No. 250,183.

*To all whom it may concern:*

Be it known that I, LAYMAN S. HYPES, a citizen of the United States, residing at Bluefield, in the county of Mercer and State of West Virginia, have invented certain new and useful Improvements in Adjustable Clevis Attachments for Plows, of which the following is a specification.

This invention relates to attachments for plows and more particularly to a device for use on an ordinary plow adapted to be operated for changing the relative positions of the double-tree and end of the plow beam.

One of the objects of the invention is to provide an attachment which may be mounted on the beam of the plow so that the operator without moving from his position behind the plow, can adjust the position of the double-tree to cause the plow to move to a greater or less depth in the soil, thereby obviating the necessity of pressing or lifting the handles of the plow.

A further object of the invention is to provide a device of this character which consists of comparatively few parts and is simple in construction, but durable and well adapted to withstand the rough usage to which devices of this character are ordinarily subjected.

For a full description of the invention and the advantages and merits thereof, reference is to be had to the following description and accompanying drawings, in which:—

Figure 1:
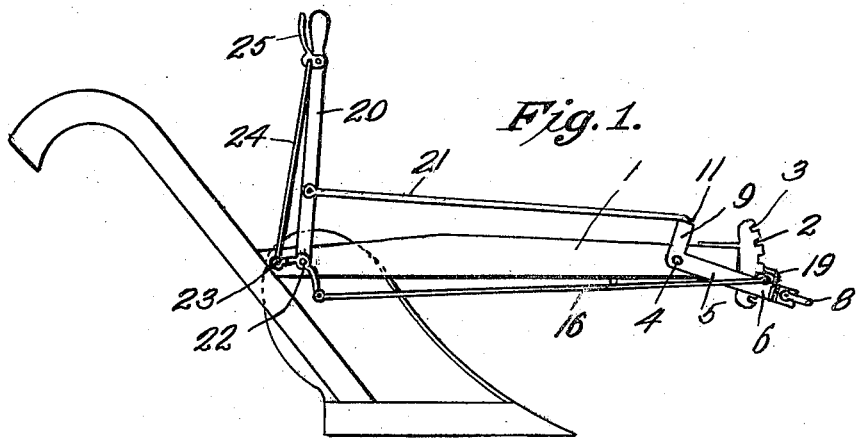
Figure 1 is a side elevation of an ordinary plow showing the invention applied thereto.

Referring to the drawings, in which like numerals of reference indicate corresponding parts throughout the several views, the plow beam 1 has mounted at the forward end thereof the clevis 2 which is provided with a plurality of notches 3 longitudinally spaced apart in a manner similar to the openings on an ordinary clevis. This clevis may be of any desired length so that a greater adjustment may be obtained if required.

Figure 2:
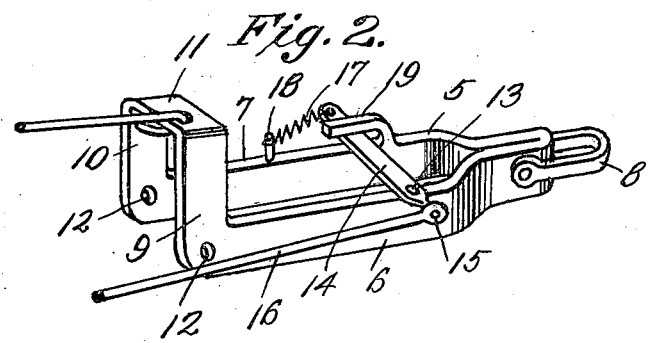
Fig. 2 is an enlarged perspective view of the mechanism mounted on the front end of the plow beam.

Longitudinally spaced from the forward end of the plow beam is a transversely extending pivot pin 4 upon which a yoke 5 is pivotally mounted. This yoke shown in detail in Fig. 2 of the drawings, comprises the parallel arms 6 and 7 the forward ends of which are joined together and carry a pivoted loop member 8 for receiving the doubletree in the usual manner. The arms 6 and 7 are long enough to extend considerably beyond the forward end of the beam so that the arms are joined together beyond the clevis 2. From their pivoted portions, right angularly extending arms 9 and 10 are extended which project upwardly above the top of the beam and are connected at their upper ends by a cross piece 11. This structure completes the pivotally mounted yoke which is adapted to swing on the pivot pin 4, the latter having its ends extended through openings 12. Pivotally mounted on a pivot bolt 13 carried by the arm 6 is a latch 14 which extends transversely across the top edges of the arms 6 and 7 and is adapted to engage the notches 3 in the clevis 2. The end of the latch 14, adjacent the pivot 13 is connected as at 15 to a pull rod 16. The opposite end of the latch projects beyond the arm 7 and is joined to one end of a contractile spring 17, the opposite terminal of which is joined to a pin 18 carried by the arm 7 so that this spring acts to pull the latch member 14 into engagement with one of the notches 3 in the clevis when the device is mounted in operative position. A retaining lug 19 is formed with the arm 7 and overlaps the latch 14 as shown in Fig. 2 of the drawing to prevent displacement of the latch.

Pivotally mounted on the rear end of the beam 1 is an actuating lever 20 which has connected thereto a connecting rod 21 the forward end of which is joined to the cross piece 11 so that when the lever 20 is pulled rearwardly, the yoke member will be swung on the pivot pin 4 to raise the loop member 8, which being attached to the double-tree will lift the double-tree. The pull rod 16 extends rearwardly and is joined to one end of a bell crank lever 22 mounted on the pivot pin 23 which has the lever 20 attached thereto. The opposite end of this bell crank lever is joined to a lift rod 24 extending upwardly along the sides of the lever 20 and joined at its upper end to a finger lever 25 pivoted on the upper end of the lever 20. Thus when the finger lever 25 is pulled toward the handle of the lever, the bell crank lever will be actuated to exert a tug on the pull rod 16 to swing the latch member 14 on its pivot 13 for disengaging the notches on the clevis. The handles or lever 20 may then be pulled to adjust the double-tree to the desired point, whereupon the latch will be released to permit the spring 17 to pull the latch into the adjacent notch in the clevis, thereby locking the mechanism in the adjusted position.

With this arrangement it is possible for the operator to readily change the position of the double-tree with respect to the end of the plow beam without moving from his position behind the plow and he can govern the depth of the plow in the soil without resorting to the usual method of pressing or lifting on the handles of the plow.

The foregoing description and accompanying drawings have reference to what might be considered to be the preferred or approved form of my invention. I desire it to be understood, that I may make such changes in the construction, combination and arrangement of parts, materials, dimensions et cetera, as may prove expedient and fall within the scope of the appended claim.

Having thus fully described my invention what I claim as new and desire to secure by Letters Patent, is:

The combination with a plow beam having a notched clevis at its end, and equipped with a pivotally mounted yoke member including parallel arms disposed on opposite sides of the said plow beam and projecting forwardly of the said clevis, the said yoke having right angularly projecting arms connected together at their ends; of a latch extended laterally across the said parallel arms of the yoke and pivotally connected to one of the same, a retaining lug carried by the other arm and normally overlying the said latch, a spring element connected to the arm which carries the said lug and to the said latch to urge the latter normally into engagement with the notches in the said clevis, the pivoted end of the said latch being extended, a pull rod connected to the said extended end of the latch, a connecting rod connected to the said joined angularly extended arms of the said yoke and manually operated means pivotally mounted on the said beam and connected to the said pull rod and the said connecting rod to manually actuate the said yoke and latch.

In testimony whereof I affix my signature in presence of two witnesses.

LAYMAN S. HYPES.

Witnesses:
J. M. KINSLEY,
W. R. ROCK.

Copies of this patent may be obtained for five cents each, by addressing the "Commissioner of Patents, Washington, D. C."